United States Patent
Zou

(10) Patent No.: US 8,355,810 B2
(45) Date of Patent: Jan. 15, 2013

(54) METHOD AND SYSTEM FOR ESTIMATING CONTEXT OFFSETS FOR RUN-TO-RUN CONTROL IN A SEMICONDUCTOR FABRICATION FACILITY

(75) Inventor: Jianping Zou, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 986 days.

(21) Appl. No.: 12/362,384

(22) Filed: Jan. 29, 2009

(65) Prior Publication Data

US 2010/0191363 A1    Jul. 29, 2010

(51) Int. Cl.
*G06F 19/00* (2011.01)

(52) U.S. Cl. .............. 700/121; 438/10; 438/14; 438/17; 438/5; 438/6; 700/106; 700/109; 700/110; 700/112; 700/117; 700/119; 700/173; 700/186; 700/28; 700/29; 700/30; 700/32; 700/48; 700/95

(58) Field of Classification Search ............ 700/121, 700/106, 109, 110, 112, 117, 119, 173, 186, 700/28, 29, 30, 32, 48, 95; 438/10, 14, 17, 438/5, 6
See application file for complete search history.

(56) References Cited

U.S. PATENT DOCUMENTS

| | | | |
|---|---|---|---|
| 6,465,263 B1 | 10/2002 | Coss, Jr. et al. | |
| 6,718,224 B2 | 4/2004 | Firth | |
| 6,725,098 B2 | 4/2004 | Edwards et al. | |
| 6,748,280 B1 | 6/2004 | Zou et al. | |
| 6,988,017 B2 * | 1/2006 | Pasadyn et al. | 700/121 |
| 7,327,475 B1 | 2/2008 | Chu et al. | |
| 2004/0058459 A1 | 3/2004 | Cho et al. | |

FOREIGN PATENT DOCUMENTS

KR    10-2007-0048832    5/2007

OTHER PUBLICATIONS

Firth, Stacy, et al., "Just-in-Time Adaptive Disturbance Estimation for Run-to-Run Control of Semiconductor Processes," IEEE Transactions of Semiconductor Manufacturing, vol. 19, No. 3, Aug. 2006, pp. 298-315.
PCT/US2010/022446 PCT Search Report mailed Aug. 18, 2010, 5 pages.
PCT/US2010/022446 PCT Written Opinion mailed Aug. 18, 2010, 4 pages.
International Preliminary Report on Patentability for PCT/US2010/022446 (P065PCT) mailed Aug. 2, 2011, 5 pages.

* cited by examiner

*Primary Examiner* — Tejal Gami
(74) *Attorney, Agent, or Firm* — Blakely, Sokoloff, Taylor & Zafman LLP

(57) ABSTRACT

A method and system for estimating context offsets for run-to-run control in a semiconductor fabrication facility is described. In one embodiment, contexts associated with a process are identified. The process has one or more threads, and each thread involves one or more contexts. A set of input-output equations describing the process is defined. Each input-output equation corresponds to a thread and includes a thread offset expressed as a summation of individual context offsets. A state-space model is created that describes an evolution of the process using the set of input-output equations. The state-space model allows to estimate individual context offsets.

16 Claims, 6 Drawing Sheets

METHOD AND SYSTEM FOR ESTIMATING CONTEXT OFFSETS FOR RUN-TO-RUN CONTROL IN A SEMICONDUCTOR FABRICATION FACILITY

FIELD OF INVENTION

Embodiments of the invention relate to run-to-run control in semiconductor fabrication, and more particularly, to context offset estimation for run-to-run control in a semiconductor fabrication facility.

BACKGROUND OF THE INVENTION

Run-to-run (R2R) control has been widely used in semiconductor fabrication facilities for controlling various processes such as overlay, photo-resist, etching, chemical-mechanical-planarization (CMP) process, or diffusion. R2R control refers to a process control in which a recipe with respect to a particular fabrication process is modified between runs to minimize the impacts of process drift. Inputs and outputs of each process run are taken into account by an R2R controller at the end of each run. With this feedback, the R2R controller is able to obtain an optimal recipe for the next run and thereby enhance the performance.

An effective way to implement an R2R control system is to use a process model. Most process models for R2R control are expressed as a linear relation between inputs and outputs. An exemplary expression of an R2R control model may be as follows:

$$y_k = bu_{k-1} + d_{k-1}$$

where $y_k$ represents an output, $u_{k-1}$ represents an input, b represents a model slope, and $d_{k-1}$ represents an offset (i.e., y-intercept).

A fabrication process is usually associated with different contexts (e.g., different fabrication tools, reticles, products, fabrication layers, etc.) that represent components of the fabrication process. Accordingly, the offset $d_{k-1}$ used in the above expression depends upon the specific contexts associated with the fabrication process and is obtained through experimentation. However, it is complicated and expensive to determine each offset value through experimentation. Thus, most R2R control systems estimate offsets based on pilot runs. A pilot run refers to a test process performed on a wafer, through which an initial offset estimation can be obtained.

Currently, in R2R control systems, a pilot run is preformed for each thread to estimate an offset of the thread. A thread refers to a specific run of the process in relation to a combination of contexts. If at least one context in a thread is changed, a new pilot run may be performed to estimate an offset for this thread. A pilot run may also need to be repeated periodically since the offset may drift during the fabrication process. An additional pilot run may be further needed after a maintenance check.

However, performing a pilot run for every thread in the fabrication process is expensive and time-consuming, especially for a "highly-mixed" semiconductor fabrication, in which numerous different products are manufactured. A typical "highly-mixed" fabrication manufactures approximately 150 different products. If each thread corresponds to a unique combination of a product and a tool, and there are 150 different products and 2 different tools, at least 150×2=300 pilot runs will be required. If a thread corresponds to a unique combination of a product, a tool and a layer, and there are 150 different products, 2 different tools and 2 different layers, then the minimum number of pilot runs will be 150×2×2=600. The same is true for "low-runner" products, for which only a few lots are processed, because a separate pilot run will still be required for each thread in the fabrication process.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
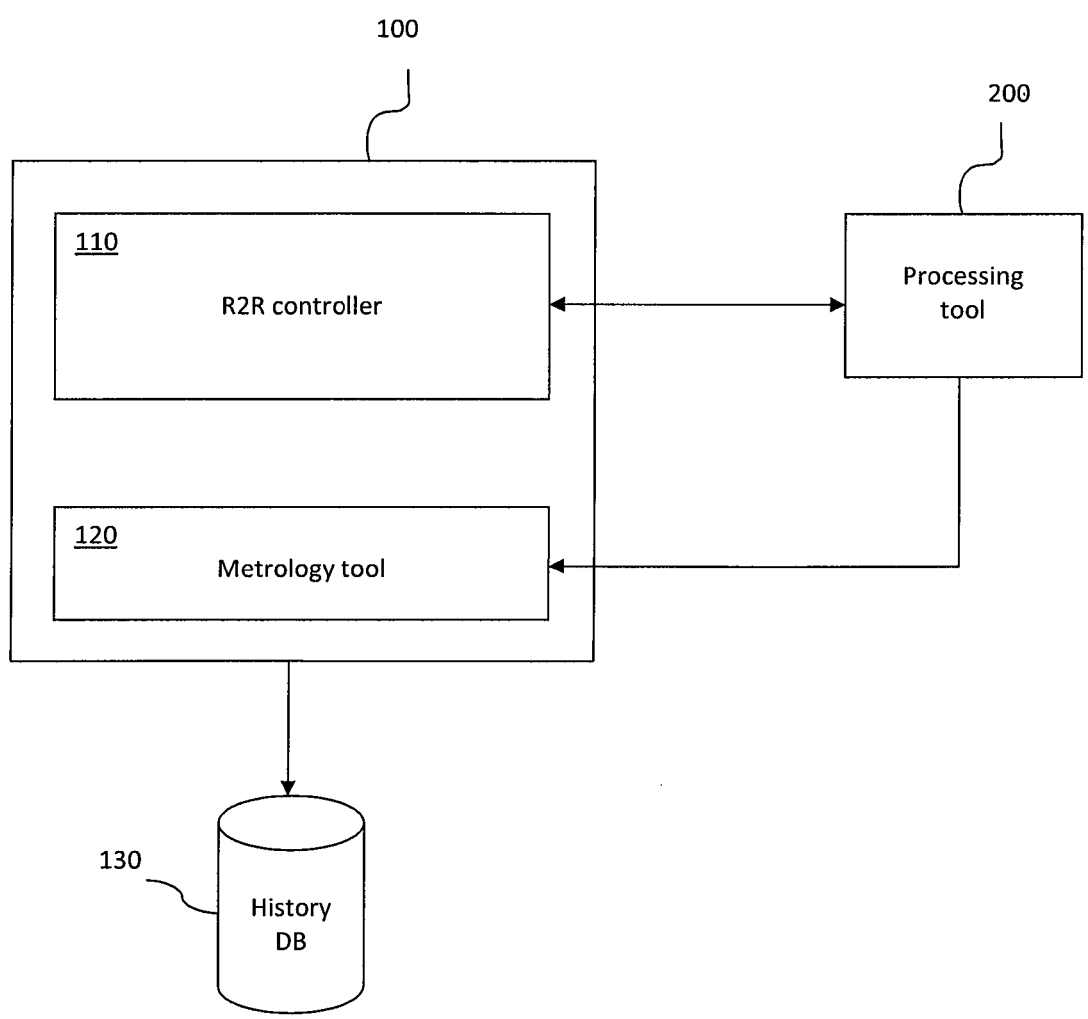
FIG. 1 is a block diagram of an exemplary system architecture in which embodiments of the invention may operate.

Embodiments of the present invention provide methods and systems for estimating offsets for run-to-run control in a semiconductor fabrication facility. A fabrication process performed in the semiconductor fabrication facility is associated with multiple contexts (e.g., tools, layers, products, etc.). A combination of contexts used in the fabrication process during a certain time period is known as a thread. The fabrication process may involve one thread or multiple threads running sequentially and/or in parallel.

In one embodiment, contexts associated with a fabrication process are identified, and a combination of contexts is determined for each thread. A set of input-output equations is defined that describes the fabrication process. Each input-output equation corresponds to a specific thread and includes a thread offset defined as intercept and expressed as a summation of individual context offsets. The individual context offsets are associated with specific contexts (e.g., a tool, a layer, a product) involved in the thread. Further, a state-space model is developed which describes an evolution of the fabrication process using the set of input-output equations. Based on the state-space model, individual context offsets are estimated, and the estimated context offsets are used to calculate the thread offset.

In one embodiment, individual context offsets associated with a first thread of the fabrication process are estimated by performing a pilot run of the first thread. For example, if a thread involves a combination of a product, a layer, a tool and a reticle, a single pilot run can be performed to estimate a product offset, a layer offset, a tool offset and a reticle offset. Then, an offset for the thread can be calculated by adding the individual context offsets together. Subsequently, the estimated individual offsets can be used to calculate an offset for a next thread that does not involve contexts that were not part of previous threads, without performing an additional pilot run. Accordingly, embodiments of the present invention allow a pilot run to be performed for a thread to estimate individual context offsets associated with the thread. The estimated context offsets can then be used to calculate offsets for multiple subsequent threads containing various combinations of the individual contexts involved in the previous threads, thereby significantly reducing the number of pilot runs and simplifying thread offset estimation.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy discs, optical discs such as CDs, DVDs and BDs (Blu-Ray Discs), and magnetic-optical discs, read-only memories (ROMs), random access memories (RAMs), EPROMs, EEPROMs, magnetic or optical cards, or any type of media suitable for storing electronic instructions, currently available or to be developed in the future.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"), random access memory ("RAM"), magnetic disc storage medium, optical disc storage medium, flash memory device, etc.

FIG. 1 is a block diagram of an exemplary system architecture in which embodiments of the present invention may operate. The system architecture may include a control system 100 and a processing tool 200.

The control system 100 may be part of a factory network and may include one or more computing devices such as personal computers, laptops, workstations, servers, or any other devices. In one embodiment, the control system 100 is implemented as a process controller system that controls a fabrication process performed by the processing tool 200 on workpieces.

The control system 100 may include an R2R controller 110, a metrology tool 120 and a history database 130. Alternatively, the metrology tool 120 and/or the history database 130 can be implemented as a system separated from the control system 100.

The R2R controller 110 may include one or more computing devices such as personal computers, laptops, workstations, servers or any other devices. In one embodiment, the R2R controller 110 includes one or more conventional controllers, commercially available controllers, manufacturing execution systems or the like. The R2R controller 110 communicates with the processing tool 200 directly or via a network. The network may be a public network (e.g., Internet) or a private network (e.g., Ethernet, a Local Area Network (LAN), a corporate intranet or a factory network) or any combination of the above. The processing tool 200 may include one or more computing devices such as a personal computer, a workstation, a server or any other device. In one embodiment, the processing tool 200 includes a "low-level" controller built into the processing tool 220.

Under the supervision of the R2R controller 110, the processing tool 200 performs a fabrication process on workpieces carried on a carrier. The type of the processing tool 200 depends on a particular implementation. In a semiconductor manufacturing facility, the processing tool 200 may be a tool for lithography, etching, chemical-mechanical-planarization (CMP) process, diffusion, or the like. The processing tool 200 may be implemented as multiple separate tools. A workpiece refers to a basic unit of material on which a process or thread is run to manufacture a product. Examples of workpieces include wafers, lead frames, die, flat panel displays, circuit boards, disks, etc. The carrier may be wafer transfer robots or wafer transfer chambers used to convey the workpieces.

The R2R controller 110 communicates with the metrology tool 120 directly or via a network. The network may be a public network (e.g., Internet) or a private network (e.g., Ethernet, a Local Area Network (LAN), a corporate intranet or a factory network) or any combination of the above. The metrology tool 120 may include one or more computing devices such a personal computer, a workstation, a server or any other device. The metrology tool 120 may also include one or more sensors to monitor the processing tool 200 and/or measure a variety of aspects of a fabrication process performed by the processing tool 200. The metrology tool 120 measures various aspects of the workpieces off-line, in-line, or a combination of both, and feeds back obtained metrology data (e.g., etch depth) to the R2R controller 110.

The R2R controller 110 also communicates with the history database 130 directly or via a network. The network may be a public network (e.g., Internet) or a private network (e.g., Ethernet, a Local Area Network (LAN), a corporate intranet or a factory network) or any combination of the above. The history database 130 may be hosted by one or more storage devices capable of storing a structured collection of data (e.g., using a relational database model, an object-oriented database model, etc.).

The history database 130 stores various information and values used by the R2R controller 110 and/or metrology data (e.g., etching depth of a wafer) measured by the metrology tool 120. The history database 130 may store additional information related to the values and/or the metrology data (e.g., expiration date for measurements, weight matrices, etc.).

R2R control refers to a process control in which a recipe with respect to a particular process can be determined or modified between runs. In semiconductor fabrication, R2R control is applied to a batch that may be as small as one workpiece (e.g., a wafer) or as large as multiple lots of workpieces. Under the R2R control scheme, the R2R controller 110 provides inputs to the processing tool 200 and receives outputs measured by the metrology tool 120 with respect to the provided inputs. With this feedback, the R2R controller 110 predicts outputs for the next run and provides new inputs adjusted based on the prediction to the processing tool 200.

An R2R control scheme is based on a process model. In one embodiment, the R2R controller 110 is based on a linear R2R process model which can be expressed as follows:

$$\gamma_k = bu_{k-1} + d_{k-1}$$

where $\gamma_k$ represents an output, $u_{k-1}$ represents an input, b represents a model slope, and $d_{k-1}$ represents an offset (i.e., y-intercept).

To start performing a fabrication process under such an R2R control scheme, the R2R controller 110 may need to estimate offsets. As in the above R2R process model equation, offsets may be defined as intercepts in a linear relation model of a fabrication process prepared for R2R control.

A fabrication process may be associated with different contexts (e.g., different tools, different products, different layers, etc.). A thread refers to a specific run of such a fabrication process, which is associated with a unique combination of contexts. For example, a thread can refer to a run in which multiple wafers in a lot are processed by a processing tool (e.g., etching tool) to form a particular layer (e.g., wiring layer) on each wafer when manufacturing a particular product (e.g., an IC chip). In this case, the thread may be specified by a combination of the particular processing tool, the particular layer and the particular product. The processing tool, the layer and the product are examples of a context.

In one embodiment, the R2R controller 110 calculates an offset for each thread. To calculate such a thread offset, the R2R controller 110 determines offsets for individual contexts in the thread. For example, if a thread has three contexts (i.e., a fabrication layer, a product and a tool), then the R2R controller 110 determines three individual context offsets (i.e., an offset for the fabrication layer, an offset for the product, and an offset for the tool). As will be discussed in more detail below, initially the R2R controller 110 estimates individual context offsets based on the result of the thread's pilot run (a test process performed on a wafer) performed by the processing tool 200. The R2R controller 110 also calculates an offset for the thread using the estimated individual offsets. In one embodiment, the R2R controller 110 calculates a thread offset by summing up the estimated individual offsets.

In one embodiment, the R2R controller 110 performs a pilot run to estimate individual offsets only for threads involving a context (e.g., a new product) not shared by previous threads. If a thread does not involve a new context (a context not shared by previous threads), the already estimated individual context offsets can be used to calculate a thread offset for this thread, without performing a pilot run of this thread. In another embodiment, the R2R controller 110 performs a pilot run to estimate individual offsets, not only for the threads involving a new context, but also for at least one thread involving only existing contexts shared by one or more previous threads. In this case, one or more individual offsets for the existing contexts will be re-estimated, and the re-estimated offsets will be used to calculate a corresponding thread offset.

In one embodiment, to estimate individual context offsets, the R2R controller 110 defines a set of linear input-output equations describing a fabrication process. Each input-output equation corresponds to a thread included in the fabrication process. In each linear input-output equation, a thread offset is defined as an intercept (e.g., y-intercept) and expressed as a summation of individual context offsets.

The R2R controller 110 also creates a state-space model which describes an evolution of the fabrication process based on the input-output equations. Subsequently, the R2R controller 110 estimates individual context offsets for each thread using the state-space model created based on the input-output equations. The input-output equations and the state-space model will be discussed in more detail below.

In one embodiment, the metrology tool 120 measures and transmits the outputs for the input-output equations with regard to the inputs provided for pilot runs by the R2R controller 110 for estimating individual context offsets. The history database 130 stores variable values and coefficient values for the input-output equations and the state-space model. The history database 130 may also store estimated individual context offsets, calculated thread offsets, recipe parameter values, etc. The history database 130 may further store "history data," which refers to data obtained from previous or past runs of a fabrication process such as input-output equations, estimated individual context offsets, calculated thread offsets, recipe parameter values, or the like.

With the estimated individual context offsets, the R2R controller 110 is able to control the fabrication process based on the R2R technology. In particular, the R2R controller 110 can determine parameters of a recipe for the fabrication process based on the estimated individual context offsets. By sending commands that specify process variables (e.g., temperature, pressure, process time, etc.) contained in the recipe, the R2R controller 110 supervises the processing tool 220.

The architecture illustrated in FIG. 1 may vary depending upon the configuration of a particular factory. For example, parts or all of the R2R controller 110 and the metrology tool 120 can be combined into a single system, or the metrology tool 120 may be implemented as separate systems. In addition, the processing tool 200 can be replaced with any other equipment controllable by the R2R controller 110.

Figure 2:
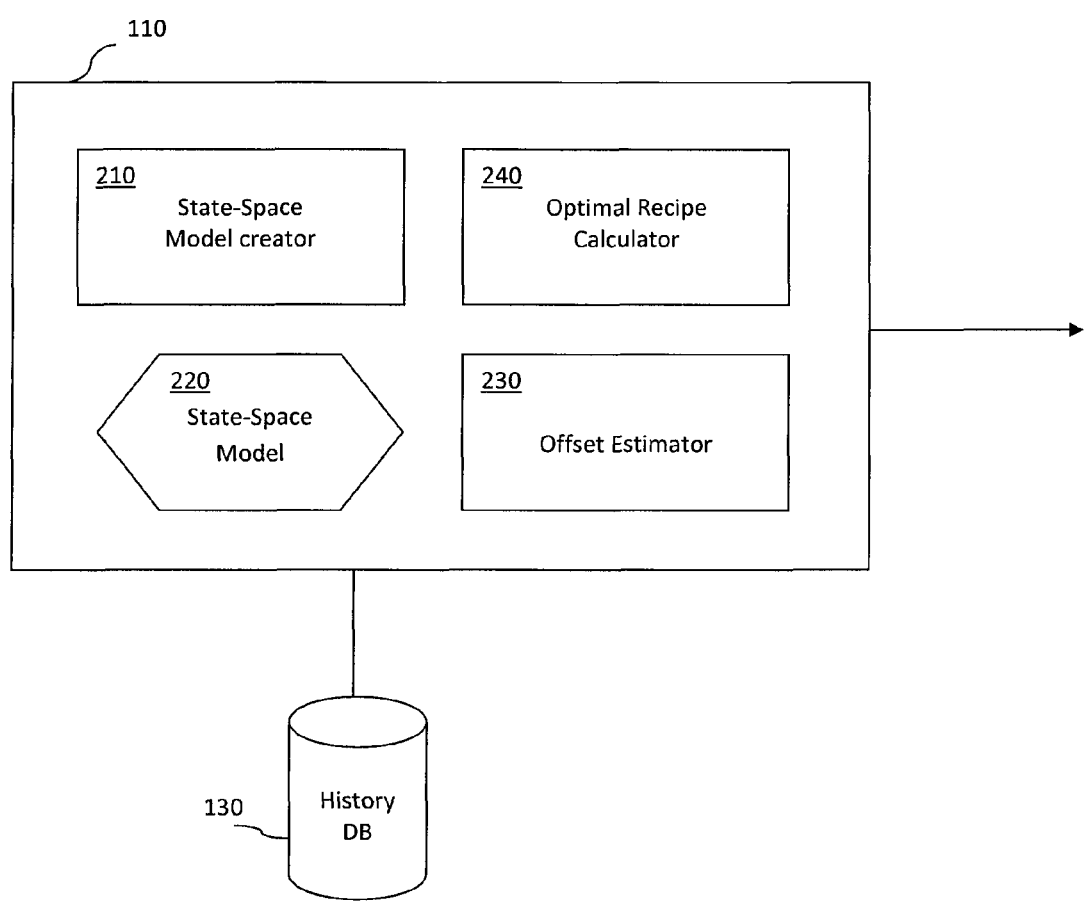
FIG. 2 illustrates a block diagram of an R2R controller in accordance with one embodiment of the present invention.

FIG. 2 illustrates a block diagram of the R2R controller 110 of FIG. 1 in accordance with one embodiment of the present invention. The R2R controller 110 may include a state-space model creator 210, state-space model 220, an offset estimator 230 and an optimal recipe calculator 240.

The state-space model creator 210 may be implemented as software that is executed by a processor of the R2R controller 110. Alternatively, at least part of the state-space model creator 210 may be implemented as circuitry or firmware. The state-space model creator 210 creates the state-space model 220 that will be used to estimate individual context offsets and prepare optimal recipes. The state-space model creator 210 may create the state-space model 220 based on information identifying contexts used in the fabrication process or threads included in the fabrication process. This information can be provided by a user or determined based on data stored in the history database 130. As discussed above, the estimated individual contexts offsets are used to calculate thread offsets. Then, the R2R controller 110 will be ready to control a fabrication process based on a linear R2R process model having the calculated thread offsets.

Once created, the state-space model 220 may be simulated to model and analyze the fabrication process. "State-space" refers to a space having axes that are state variables, and the state of the fabrication process can be represented as a vector within the space.

The state-space model 220 may be an equation-based model (e.g., linear, time-invariant, Z-domain of discrete time-invariant, etc.). In one embodiment, the state-space model 220 describes an evolution of the fabrication process using a set of linear input-output equations describing the fabrication process.

As discussed above, a fabrication process may be associated with multiple individual contexts, and a thread indicates a specific run of the fabrication process with a particular combination of individual contexts. Accordingly, each linear input-output equation corresponds to a thread included in the fabrication process.

In one embodiment, an input-output equation for a $k^{th}$ run involving a first tool, a first product and a first layer is formulated as the following linear equation:

$$y_k = bu_{k-1} + d_{t1,k-1} + d_{p1,k-1} + d_{l1,k-1} \quad (1.1)$$

In equation (1.1), $y_k$ and $u_{k-1}$ represent an output vector and an input vector, respectively, and b is the slope obtained through experimentation. The terms, $d_{t1,k-1}$, $d_{p1,k-1}$ and $d_{l1,k-1}$ represent individual context offsets of the three individual contexts. Each individual context offset could be a constant or may vary in accordance with a model of integrated white noise. The subindices t1, p1 and l1 indicate the first tool, the first product and the first layer, respectively.

For another specific run, namely, an $m^{th}$ run involving the first tool, a second product and a second layer, the input-output equation will be as follows:

$$y_k = bu_{m-1} + d_{t1,m-1} + d_{p2,m-1} + d_{l2,m-1} \quad (1.2)$$

In equation (1.2), $y_m$ and $u_{m-1}$ represent an output vector and an input vector, respectively, and b is the slope obtained through experimentation. The terms, $d_{t1,m-1}$, $d_{p2,m-1}$ and $d_{l2,m-1}$ are individual context offsets of the three individual contexts. Each individual context offset could be a constant or may vary in accordance with a model of integrated white noise. The subindices $t_1$, p2 and l2 indicate the first tool, the second product and the second layer, respectively.

Each of equations (1.1) and (1.2) stands on the assumption that a thread offset is a summation of individual context offsets of the three individual contexts involved in each thread. As a result, the thread offset $d_k$ for $k^{th}$ run will be as follows:

$$d_k = d_{t1,k-1} + d_{p1,k-1} + d_{l1,k-1} \quad (1.3)$$

The thread offset $d_m$ for $m^{th}$ run will be as follows:

$$d_m = d_{t1,m-1} + d_{p2,m-1} + d_{l2,m-1} \quad (1.4)$$

In the above examples, only three individual contexts are considered in each thread for simplification. However, a skilled person in the art would easily extend equations (1.1) through (1.4) to include any number of individual contexts.

In one embodiment, the state-space model 220 is automatically created by converting the set of linear input-output equations into a state-space model form. The state-space model 220 describes an evolution of the fabrication process as follows:

$$x_{k+1} = Ax_k + Bu_k + Fw_k \quad (1.5)$$

$$y_k = C_k x_k \quad (1.6)$$

In equations (1.5) and (1.6), $y_k$ and $u_k$ represent a process output vector and a process input vector, respectively, $x_k$ represents a process state vector, $w_k$ represents a process state noise vector, and A, B, C and F represent parameter matrices.

Equation (1.5) can be referred to as a "state equation." Each "state" (i.e., an element of the process state vector $x_k$) in the state equation represents the individual offset of a context, and thus, all "states" (i.e., all elements of the process state vector $x_k$) in the state equation represent a collection of individual offsets of all the contexts in the fabrication process. As a result, the state equation is able to describe the evolution of the context offsets for the fabrication process. Meanwhile, equation (1.6) can be referred to as an "output equation" and represents the output of a specific run associated with a set of contexts (i.e., a specific thread). Accordingly, parameter matrices A, B, C and F are defined as follows:

$$A_k = \begin{bmatrix} 0 & 0 & \cdots & 0 \\ 0 & I_1 & \cdots & 0 \\ \vdots & \vdots & \ddots & \vdots \\ 0 & \cdots & \cdots & I_M \end{bmatrix}, B_k = \begin{bmatrix} 1 \\ 0 \\ \vdots \\ 0 \end{bmatrix}, C_k = [\, b \quad c_{q,1} \quad \cdots \quad c_{q,M}\,] \quad (1.7)$$

$$F_k = \begin{bmatrix} 0 & 0 & \cdots & 0 \\ I_1 & 0 & \cdots & 0 \\ 0 & I_2 & \cdots & 0 \\ \vdots & \vdots & \ddots & \vdots \\ 0 & 0 & \cdots & I_M \end{bmatrix}$$

Matrix A, as well as matrix F, indicates that each context offset follows the model of integrated white noise. In the above matrices (1.7), M represents the number of types of contexts, and $I_j$ (j=1, 2, ..., M) represents an identity matrix with a dimension of the number of contexts with type j. In one embodiment, the elements of row vector $c_{q,1}, c_{q,2}, \ldots, c_{q,M}$ are defined as:

$$c_{qj}, j = \begin{cases} 0 & \text{for other contexts of type } j \\ 1 & \text{when } q_j^{th} \text{ context of type } j \text{ is used in the current run} \end{cases} \quad (1.8)$$

With a fabrication process containing three types of contexts—processing tool, product and layer, the matrices will be:

$$A = \begin{pmatrix} 0 & 0 & 0 & 0 \\ 0 & I_t & 0 & 0 \\ 0 & 0 & I_p & 0 \\ 0 & 0 & 0 & I_L \end{pmatrix}$$

$$B = \begin{pmatrix} 0 \\ 0 \\ 0 \\ 0 \end{pmatrix}$$

$$C = (\, b \quad c_{T,q} \quad c_{p,r} \quad c_{L,s}\,)$$

$$D = \begin{pmatrix} 0 & 0 & 0 \\ I_T & 0 & 0 \\ 0 & I_P & 0 \\ 0 & 0 & I_L \end{pmatrix}$$

In the above matrices (1.9), $I_T$, $I_P$ and $I_L$ are identity matrices with a dimension of the number of products and the number of layers, respectively. For example, if a process is associated with three tools, two products and two layers, $I_T$ will be a 3-by-3 matrix in which all the elements on the main diagonal are equal to 1 and all other elements are equal to 0. $I_P$ and $I_L$ will be 2-by-2 matrices in which all the elements on the main diagonal are equal to 1 and all other elements are equal to 0. The elements, $c_{T,q}$, $c_{P,r}$, and $c_{L,s}$ will be:

$$c_{T,q} = \begin{cases} 0 & \text{for other tools} \\ 1 & \text{when } q^{th} \text{ tool is used in the current run} \end{cases} \quad (1.10)$$

$$c_{P,r} = \begin{cases} 0 & \text{for other products} \\ 1 & \text{when } r^{th} \text{ product is manufactured in the current run} \end{cases}$$

$$c_{L,s} = \begin{cases} 0 & \text{for other layers} \\ 1 & \text{when } s^{th} \text{ layer is formed in the current run} \end{cases}$$

In the above example (i.e., a process is associated with three tools, two products and two layers), if a thread involves a first tool, a first product and a first layer, then, $c_{T,1}$ will be (1 0 0), $c_{P,1}$ will be (1 0), and $c_{L,1}$ will be (1 0), and thus, C will be $\begin{bmatrix} 1 & 0 & 0 & 1 & 0 & 1 & 0 \end{bmatrix}$, which specifies the thread. The other parameter matrices, A, B and F, will be as follows:

$$A = \begin{pmatrix} 0 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix} \quad (1.11)$$

$$B = \begin{pmatrix} 1 \\ 0 \\ 0 \\ 0 \\ 0 \\ 0 \\ 0 \\ 0 \end{pmatrix}$$

$$F = \begin{pmatrix} 0 & 0 & 0 & 0 & 0 & 0 & 0 \\ 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{pmatrix}$$

Figure 3:
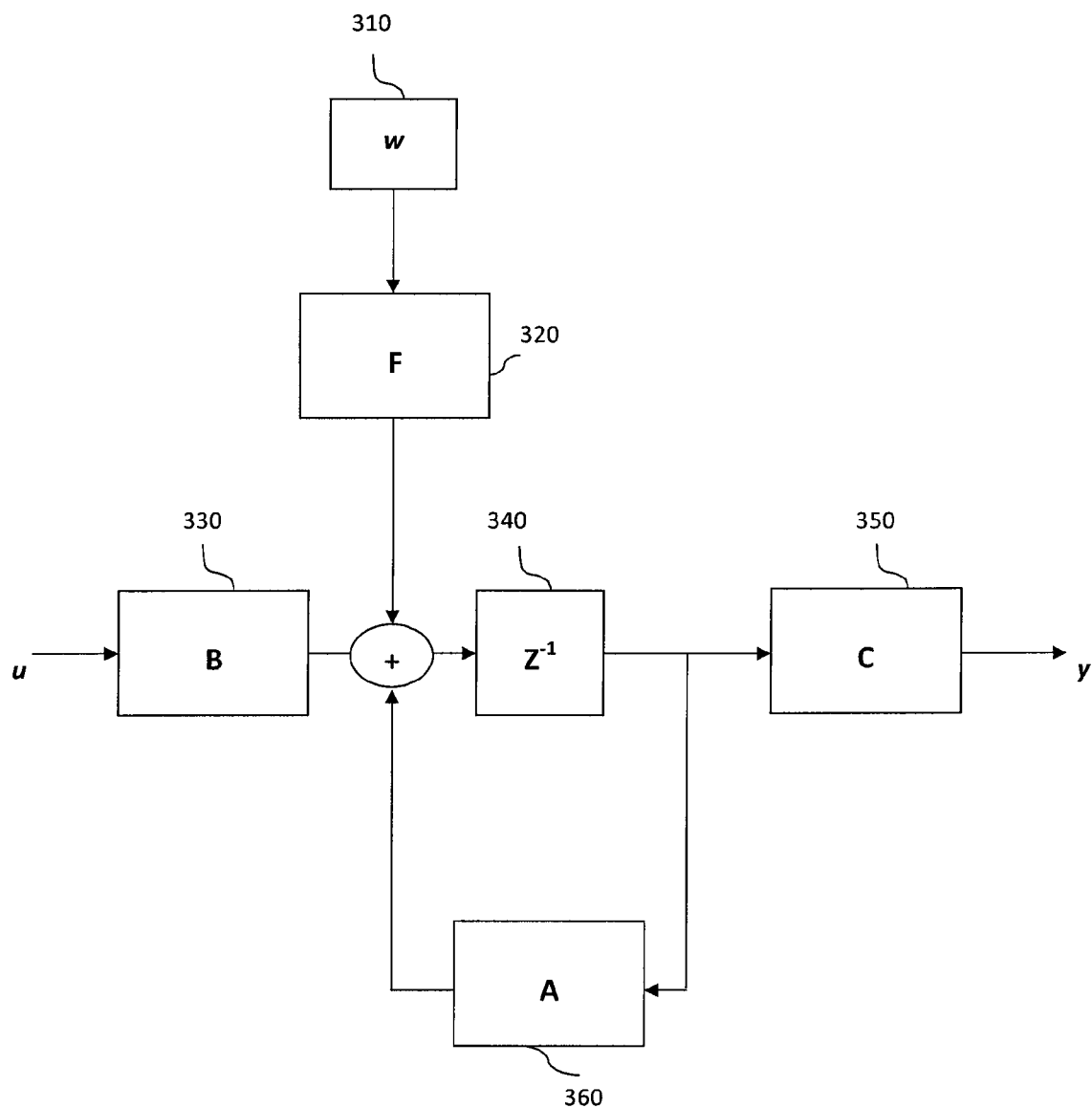
FIG. 3 illustrates a block diagram of a state-space model created in accordance with one embodiment of the present invention.

FIG. 3 illustrates a block diagram of the state-space model 220 of FIG. 2 in accordance with one embodiment of the present invention. Referring to FIG. 3, equations (1.5) and (1.6) describing the dynamic behavior of a fabrication process are expressed as a linear discrete-time system. In the linear discrete-time system, block 310 represents the process state noise vector w, which is assumed to be white noise, and block 320 represents the parameter matrix F, which corresponds to a noise gain matrix. Block 330 represents the parameter matrix B, which corresponds to an input gain matrix. Block 340 represents an inverse discrete transfer function $Z^I$, called the z transform, which enables analysis of the relationship between the input u and the output y. Block 350 represents the parameter matrix C, which corresponds to an output coefficient matrix. Finally, block 370 represents the parameter matrix A, which corresponds to a process dynamic matrix.

As such, a set of linear input-output equations describing a fabrication process can be converted into a state-space model form (e.g., equations (1.5) and (1.6)). Each state in the state-space model corresponds to the individual offset of a context in the fabrication process. Each run of the fabrication process corresponds to a specific state equation and a specific output equation in the state-space model. In other words, the pair of a specific state equation and a specific output equation is associated with a thread for each run. Accordingly, the thread offset of a thread corresponds to a summation of the states corresponding to the contexts involved in this thread. In summary, by converting a set of linear input-output equations into a state-space model form, various estimation techniques for state-space model schemes can be used to estimate individual context offsets which are incorporated into the state-space model.

Returning to FIG. 2, the state-space model 220 is coupled with the offset estimator 230. The offset estimator 230 may be implemented in hardware (e.g., as a device having input/output circuitry that forms an interface between input/output (I/O) devices such as a keyboard, mouse, display, etc.). Alternatively, the offset estimator 230 may be implemented in software or a combination of hardware and software.

The offset estimator 230 is responsible for estimating individual context offsets using the state-space model 220 encompassing a set of linear input-output equations describing a fabrication process. When estimating individual context offsets for a thread, the offset estimator 230 obtains values resulting from the thread's pilot run (and history run) performed by the processing tool 200 and passes these values to the state-space model 220. Alternatively, the resulting values are directly provided to the state-space model 220. In order to estimate individual context offsets, the offset estimator 230 may use various estimation techniques applicable to the state-space model scheme.

In one embodiment, the offset estimator 230 uses the moving horizon state estimation (MHSE) technology based on the state-space model 220 to estimate individual context offsets. The MHSE technology is capable of incorporating constraints on states and disturbances and thus, may produce an optimal result for industrial hybrid systems involving dynamic components. Under the MHSE scheme, the offset estimator 230 formulates an objective function, J, as follows:

$$J = \min_{w_{k-N-1} \ldots w_{k-1}} \Sigma_{i=k-N-1}^{k-1} w'_i Q w_i + \Sigma_{i=k-N}^{k} v'_i R_i v_i \quad (1.12)$$

$$x_{i+1} = A_i x_i + B_i u_i + F_i w_i \quad (1.13)$$

$$y_i = C_i x_i + v_i, i = k-N, k-N+1, \ldots, k \quad (1.14)$$

$$w_{min} \leq w_i \leq w_{max} \quad (1.15)$$

$$v_{min} \leq v_i \leq v_{max} \quad (1.16)$$

$$x_{min} \leq x_i \leq x_{max} \quad (1.17)$$

In the above equations (1.12) through (1.17), $Q_i$ and $R_i$ represent tuning parameter (weighting) matrices for a thread i, N represents a tuning value, which is referred to as "horizon," indicating the number of the previous input-output equations (and history data) used in an estimation for current thread i, $w_i$ represents the state error for current thread i, and $v_i$ represents the error between the model predictions and measurements for current thread i. The values $w_{min}$, $w_{max}$, $v_{min}$, $v_{max}$, $x_{min}$ and $x_{max}$ define constraints on the state errors and the individual context offset estimation. In another embodiment, the subindex i represents lot i of workpieces (e.g., wafers). In yet another embodiment, the subindex i represents workpiece i. Meanwhile, equations (1.13) and (1.14) represent the same state-space model by equations (1.5) and (1.6) but are rewritten to make their subindices consistent with the objective function J of equation (1.12) except that $v_i$ is added to equation (1.14).

Based on the above equations (1.12) through (1.17) that implement an MHSE scheme, the offset estimator 230 estimates individual context offsets. Because the individual context offsets are incorporated as state variables for the state-space model 220 (i.e., elements of the process state matrix), by estimating state variables using the MHSE scheme, the offset estimator 230 is able to estimate the individual context offsets. For a first thread corresponding to a combination of individual contexts, the offset estimator 230 estimates each individual context offset (for the contexts involved in the first thread) using the above MHSE scheme.

For subsequent threads, the offset estimator 230 may or may not estimate individual context offsets. If all contexts involved in a subsequent thread were used in the previous threads, the offset estimator 230 may not need to perform an estimation for the subsequent threads. Instead, the offset estimator 230 can calculate an offset of the subsequent thread using previously estimated offsets of the individual contexts involved in the subsequent thread. Alternatively, the offset estimator 230 may perform an estimation for one or more subsequent threads that do not include a new context. In this case, the offset estimator 230 may re-estimate one or more context offsets of existing contexts involved in the previous threads. The offset estimator 230 may use the re-estimated context offsets to calculate an offset of a subsequent thread.

If a subsequent thread involves at least one context that was not part of any of the previous threads, the offset estimator 230 should perform the estimation for the subsequent thread. For example, if a subsequent thread involves a new context and two existing contexts used in a previous thread, the offset estimator 230 should estimate the offset for the new context and re-estimate the offsets for the two existing contexts. For the re-estimation, the offset estimator 230 may rely on a new input-output equation (incorporated in the state-space model 220) or may rely on both the new input-output equation and an old input-output equation defined for the previous thread (incorporated in the state-space model 220).

The offset estimator 230 is also responsible for calculating thread offsets using estimated individual offsets. In one embodiment, the offset estimator 230 calculates a thread offset by summing up the estimated individual offsets for the thread.

In one embodiment, the offset estimator 230 estimates individual offsets using the MHSE technique based on the above equations (1.12) through (1.17). These equations make it possible to perform a "minimum-norm estimation" to obtain individual context offsets. The minimum-norm estimation is a well-known estimation technique (as an MHSE methodology) that allows to obtain the most probable current distribution of a measurement. In performing the minimum-norm estimation under the moving horizon state estimation (MHSE) theory, "horizon" (e.g., "N" in equations (1.12) and (1.14)) may be defined as the number of previous runs used for the estimation. As discussed above, one or more previous runs of the fabrication process can be used for estimating individual offsets of the contexts in the fabrication process. In one embodiment, a "horizon" is determined to include some or all the previous runs.

If a "horizon" is not large enough and/or if the context switching in previous runs is not frequent (or diverse) enough to provide a unique solution for the estimation, the estimation (of context offsets from the above equations) may be "biased." As discussed above, each run of a fabrication process generates an input-output equation (e.g., equation (1.1)). If the number of input-output equations, which participate in the estimation of context offsets, is not large enough (i.e., the number of previous runs used for the estimation is not large enough), a unique solution for the context offsets may not be obtained, and the resultant estimation of the context offsets may be "biased." For example, if only a single run of a fabrication process is used to estimate individual offsets for three contexts involved in the single run (corresponding to a specific thread), the estimation will be based on only one input-output equation generated from the single run. Thus, the estimated individual offsets of the three contexts may be "biased." Likewise, if the context switching in previous runs is not frequent enough, for example, if all previous runs contain the same contexts for a fabrication process, the resultant estimated individual offsets may be "biased." Nonetheless, the calculated thread offset (e.g., a summation of the estimated context offsets) through the "minimum norm estimation" based on equations (1.13) through (1.17) can be "unbiased" (i.e., reliable) as long as the thread corresponds to a combination of the contexts "within the horizon" (i.e., included in the previous or current runs used for the estimation).

As such, the offset estimator 230 is able to estimate individual context offsets and calculate a thread offset for a thread, based on a single pilot run for the thread, (which is used to provide input values for a corresponding input-output equation incorporated in the state-space model 220). In addition, the offset estimator 230 can minimize the number of pilot runs by reusing individual contexts offsets estimated from previous pilot runs when calculating offsets of subsequent threads.

The optimal recipe calculator 240 is responsible for calculating an optimal recipe for a fabrication process using estimated individual offsets. A fabrication process may be associated with one or more recipes for processing workpieces. A recipe may be a set of instructions (e.g., for a "low-level" controller built in the processing tool 200 of FIG. 1), settings, and parameters. A recipe may be subject to change between runs or fabrication processes. In one embodiment, the optimal recipe calculator 240 calculates an optimal recipe using the model predictive control (MPC) technology. The MPC technology is used to predict the behavior of outputs of a dynamic system with respect to changes in inputs, and MPC schemes are constructed on the basis of a process model and process measurements. The optimal recipe calculator 240 uses the MPC technology to find values for recipe parameters in conjunction with the state-space model 220.

In one embodiment, the optimal recipe calculator 240 formulates an MPC scheme based on the following mathematical equations:

$$J = \min_{u_{k+N}, u_{k+N}} \sum_{i=1}^{N+1}(y_T - y_{k+i})'Q^i(y_T - y_{k+i}) + \sum_{i=0}^{N} \Delta u'_{k+i} R_i u_{k+i} \quad (1.18)$$

$$x_{k+i} = A x_{k+i-1} B u_{k+i-1}, x_k = x_{init} \quad (1.19)$$

$$y_{k+i} = C x_{k+1}, i=1,2,\ldots,N+1 \quad (1.20)$$

$$y_{min} \leq y_{k+i} \leq y_{max} \quad (1.21)$$

$$u_{min} \leq u_i \leq u_{max} \quad (1.22)$$

$$\Delta u_{min} \leq \Delta u_{k+i} \leq \Delta u_{max} \quad (1.23)$$

$$\Delta u_{k+i} = u_{k+i} - u_{k+i-1} \quad (1.24)$$

$$y_T = y_{k+N+1} \quad (1.25)$$

In the above equations (1.18) through (1.25), $Q_i$ and $R_i$ represent tuning parameter (weighting) matrices for a current thread i, and N represents a tuning value indicating the number of the future runs to be predicted from current thread i. The variables u and y indicates input vectors and output vectors, respectively. The values $u_{min}$, $u_{max}$, $y_{min}$, and $y_{max}$ define constraints on the inputs and the outputs. Alternatively, the subindex i may represent lot i of workpieces (e.g., wafers) or workpiece i. Meanwhile, equations (1.19) and (1.20) represent the same state-space model by equations (1.5) and (1.6) but are rewritten to make their subindices consistent with equation (1.18).

Based on the above equations (1.18) through (1.25) that implement an MPC scheme, the optimal recipe calculator 240 calculates recipe parameters (e.g., etching time) included in a recipe. As expressed in the above scheme, the optimal recipe calculator 240 uses predicted data, as well as past data, for determining the recipe parameters. The optimal recipe calculator 240 can prepare a recipe after the entire fabrication process is completed or after a specific thread is performed.

Figure 4:
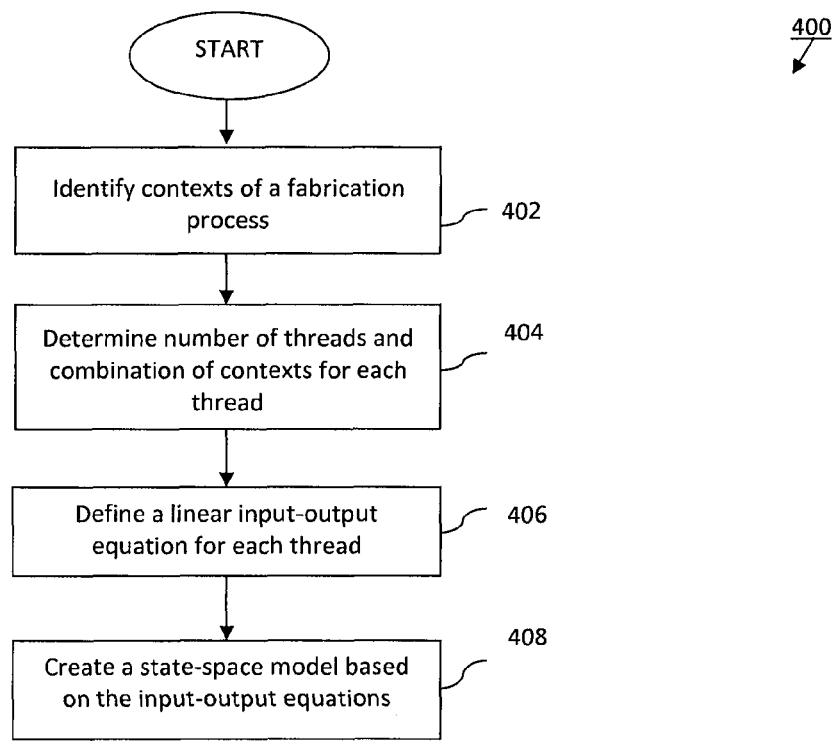
FIG. 4 is a flow diagram of one embodiment of a method for creating a state-space model for estimating offsets for a fabrication process in accordance with one embodiment of the present invention.

FIG. 4 is a flow diagram of one embodiment of a method 400 for creating a state-space model for estimating individual context offsets for a fabrication process. The method 400 is performed by processing logic that may comprise hardware (circuitry, dedicated logic, etc.), software (such as is run on a general purpose computer system or a dedicated machine), or a combination of both. In one embodiment, the method 400 is performed by the R2R controller 110 of FIG. 1.

Referring to FIG. 4, the method 500 creates a state-space model for estimating individual context offsets which will be used in a linear R2R control process model for a fabrication process. To that end, processing logic begins with identifying contexts associated with the fabrication process. (block 402). As discussed above, a fabrication process may be associated with different contexts (e.g., different tools, different products, different layers, etc.). A context can be defined as a component of a fabrication process, which contributes offsets (e.g., intercepts in a linear R2R control process model prepared for the fabrication process). In one embodiment, contexts associated with the fabrication process can be specified by a user or determined automatically based on information stored in a database (e.g., the history database 130). At block 404, processing logic determines the number of threads included in the fabrication process and combinations of contexts for each thread. As discussed above, a fabrication process may contain different threads. A thread represents a specific run of the fabrication process, which is associated with a unique combination of contexts. For example, a thread can refer to a process run in which multiple wafers in a lot are processed by a processing tool (e.g., etching tool) to form a particular layer (e.g., wiring layer) on each wafer when manufacturing a particular product (e.g., an IC chip). In this case, the thread is associated with a combination of the particular processing tool, the particular layer and the particular product. The numbers of threads or combinations of contexts can be specified by a user or determined automatically based on information stored in a database.

At block 406, processing logic defines a linear input-output equation (e.g., equation (1.1)) that corresponds to each thread included in the fabrication process. As a result, a set of linear input-output equations is obtained for the fabrication process. In the input-output equation, a thread offset is defined as intercept and expressed as a summation of individual context offsets. The individual context offsets may be independent of each other (i.e., independent variables in the input-output equation).

At block 408, processing logic creates a state-space model using the input-output equations for describing the fabrication process. In one embodiment, processing logic converts the input-output equations into a state-space model form describing an evolution of the fabrication process. As discussed above, each state in the state-space model corresponds to the individual offset of a context in the fabrication process. Each run of the fabrication process corresponds to a specific state equation and a specific output equation in the state-space model. The thread offset of a thread corresponds to a summation of the states corresponding to the contexts involved in the same thread. The state-space model may be described as a linear discrete-time system (e.g., the state-space model in FIG. 3). The created space-state model allows estimation of individual context offsets using history runs that include a limited number of pilot runs.

Figure 5:
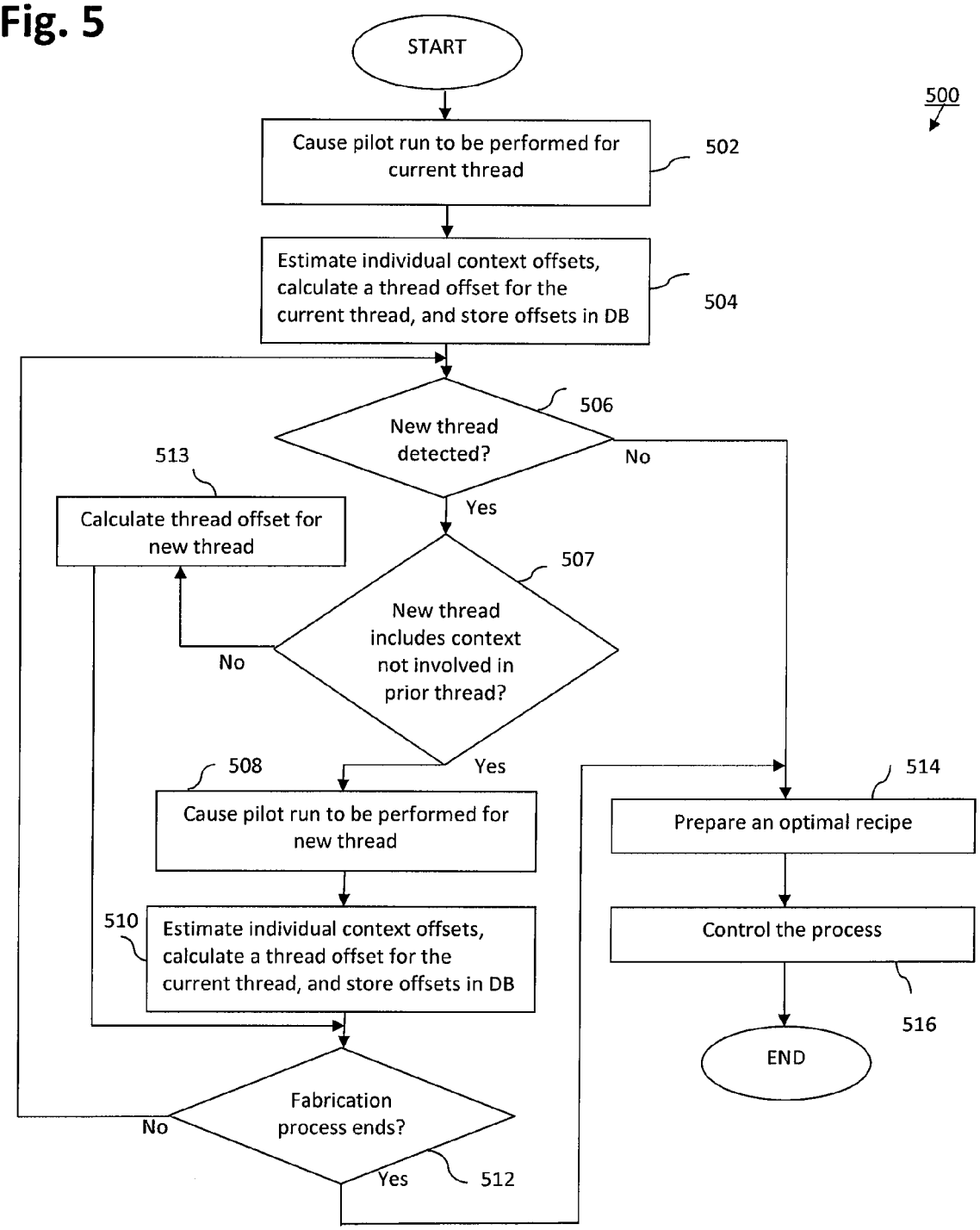
FIG. 5 is a flow diagram of one embodiment of a method 500 for estimating individual context offsets using a state-space model created for the estimation in accordance with one embodiment of the present invention.

FIG. 5 is a flow diagram of one embodiment of a method 500 for estimating individual context offsets using a state-space model. The method 500 is performed by processing logic that may comprise hardware (circuitry, dedicated logic, etc.), software (such as is run on a general purpose computer system or a dedicated machine), or a combination of both. In one embodiment, the method 500 is performed by the R2R controller 110 of FIG. 1.

Referring to FIG. 5, processing logic begins with causing a pilot run to be performed for a first thread included in a fabrication process (block 502). To that end, processing logic determines input values (e.g., etching time) for a first linear input-output equation corresponding to the first thread (e.g., a corresponding input-output equation defined and included in the state model in the method 400) and passes the input values to a processing tool (e.g., processing tool 200 of FIG. 1) with a command to perform a pilot run. In one embodiment, processing logic measures output values (e.g., critical dimension) using data received from the processing tool performing the pilot run. In another embodiment, processing logic receives the output values measured by a metrology tool (e.g., metrology tool 120 of FIG. 1). By causing the pilot run to be performed, processing logic obtains an input-output pair values for the first input-output equation incorporated in the state-space model. With the input-output pair values, processing logic is able to estimate individual context offsets for the first thread using the state-space model (e.g., the state-space model expressed as state-model equations (1.5) and (1.6)). In one embodiment, processing logic adopts a moving horizontal state estimation (MHSE) methodology based on the state-space model to estimate individual context offsets. The MHSE methodology may be formulated as mathematical equations (e.g., equations (1.12) through (1.17)). By applying the MHSE methodology to the state-space model, the individual context offset will be estimated.

At block 502, processing logic also calculates a thread offset for the first thread by summing up the estimated individual context offsets. Processing logic stores the estimated context offsets and the calculated thread offset in a database (e.g., a history database 130 of FIG. 1).

Subsequently, processing logic determines whether a new thread is detected at block 506. If not, processing logic proceeds to block 514. If so, at block 507, processing logic determines whether the new thread involves a context that was not a part of any previous threads. The new thread may involve a context that was not part of any previous threads, if, for example, during the performance of a fabrication process associated with two tools and two products, processing of a current product may become completed, and processing of a new product (using the same tool) may begin, thereby starting a new thread. If the new thread involves a context that was not a part of any previous threads, processing logic causes a pilot run to be performed for the new thread (block 508). After receiving outputs resulting from the pilot run, processing logic applies the inputs and the received outputs to the corresponding input-output equation incorporated in the state-space model. At block 510, processing logic estimates individual context offsets for the new thread using the new input-output equation (i.e., using the state-space model reflecting the new inputs and outputs obtained at block 508). In one embodiment, the processing logic estimates each individual context offset for the new thread based on the previous and new input-output equations (i.e., the state-space model reflecting all the input and output values obtained for the previous and new input-output equations). The processing logic will re-estimate one or more existing individual contexts involved in any of the previous threads and remained in the new thread.

To estimate individual context offsets, the processing logic may use an MHSE methodology (e.g., the MHSE scheme based on equations (1.12) through (1.17)), which stands on the state-space model. The processing logic also calculates a thread offset for the new thread by adding the estimated individual context offsets. In one embodiment, the processing logic uses the most currently estimated individual context offsets to calculate a thread offset if there is more than one individual offset estimated for a context. For example, a context existing in both the previous and current threads may be estimated twice, one with the previous input-output equation and the other with the current input-output equation. After the estimation, processing logic stores the offsets of the new thread in the database and proceeds to block 512.

If processing logic determines that all contexts of the new thread were involved in previous threads (block 507), processing logic does not need to perform a pilot run for the new thread. Rather, processing logic finds offsets of the new thread's contexts in the database and calculates the new thread's offset using the context offsets retrieved from the database (block 513). In one embodiment, processing logic re-estimates individual offsets for one or more existing contexts in the new thread using history data (e.g., input-output equations obtained from the past or previous runs of a fabrication process, stored in the database) and uses the re-estimated individual offsets to calculate a thread offset of the new thread. Processing logic then proceeds to block 512.

At block 512, processing logic determines whether the fabrication process has ended. If not, processing logic returns to block 506. If so, processing logic prepares an optimal recipe for the fabrication process (block 514). As discussed above, a fabrication process may be associated with one or more recipes for processing workpieces. A recipe may be a set of instructions, settings, and parameters. In one embodiment, the processing logic calculates a recipe using the model predictive control (MPC) technology based on the state-space model. An MPC scheme may be constructed as mathematical equations (1.18) through (1.25) including the state-space model equations (1.19) and (1.20). The state-space model equations incorporate the estimated individual context offsets as the elements of the process state matrix. By applying such MPC schemes to the state-space model equations (1.19) and (1.20), processing logic is able to obtain prediction values for the outputs of the input-output equations for the fabrication process. Based on the prediction values, the processing logic determines initial recipe parameters to start the fabrication process.

At block 516, processing logic is able to control the fabrication process using the calculated recipe. In particular, processing logic provides commands including recipe parameters to the processing tool 200 and monitors feedback received from the processing tool 200.

As such, according to embodiments of the present invention, a thread offset, as well as individual context offsets of the thread, can be estimated with a single pilot run. In addition, a new thread will not require an extra pilot run if it involves contexts involved in any of the previous threads. Thus, the number of pilot runs for performing a fabrication process can be significantly reduced. In another embodiment, the recipe is prepared after each thread is completed or after a particular thread is completed.

Figure 6:
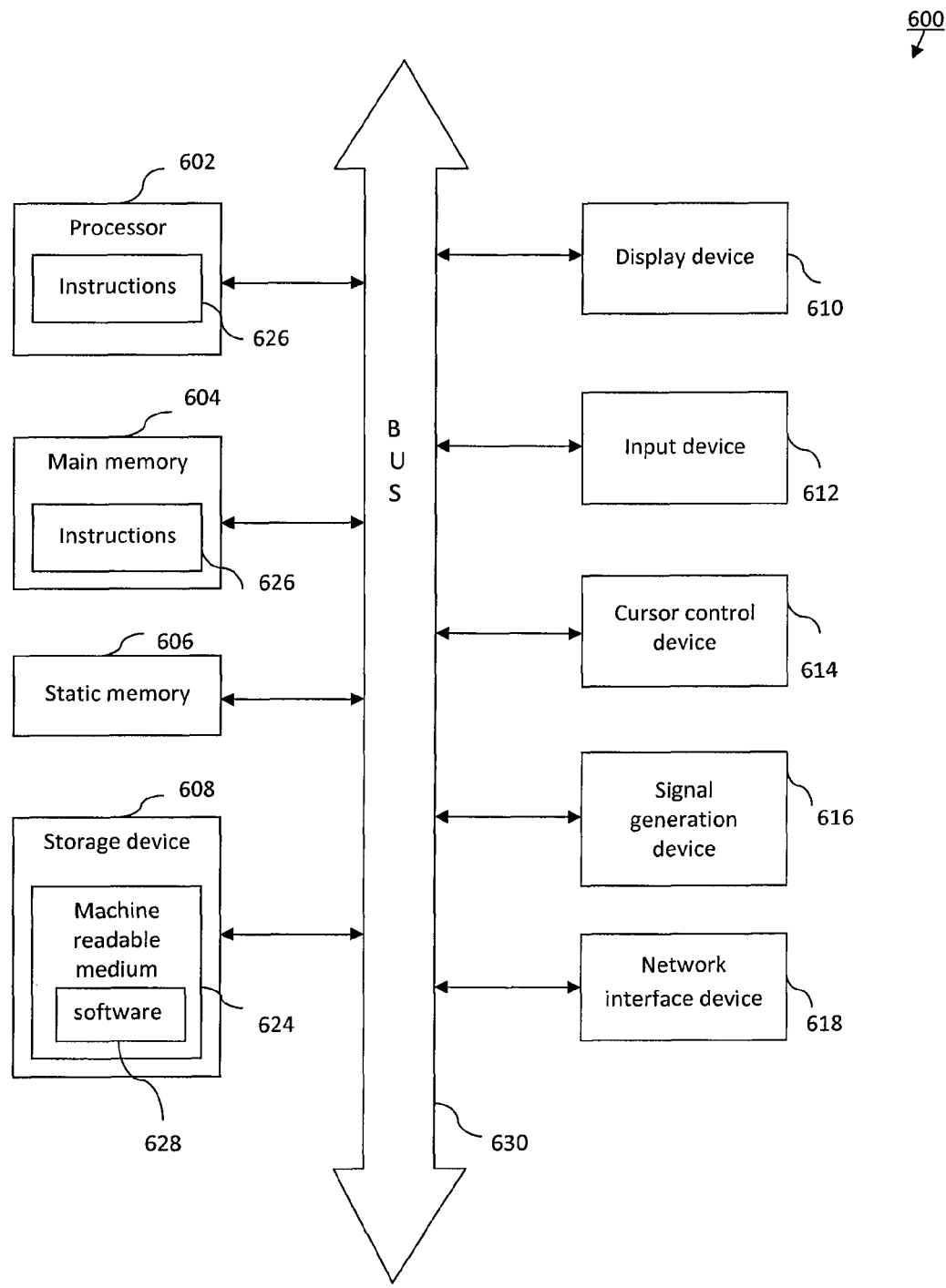
FIG. 6 is a block diagram of an exemplary computer system that may perform one or more of the operations described herein.

FIG. 6 illustrates a diagrammatic representation of a machine (e.g., a computer) in the exemplary form of a computer system 600 within which a set of instructions, for causing the machine to perform any algorithms or methodology discussed herein, may be executed. In alternative embodiments, the machine may be connected (e.g., networked) to other machines in a LAN, a WAN, an intranet, an extranet, the Internet, or a wireless network. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any other machines capable of executing a set of instructions (sequential or combinational or otherwise) that specify actions to be taken by that machine. Executing the set of instructions are performed sequentially or by multitasking or by threading. Further, while only a single machine is illustrated, the term "machine" shall also be taken to include any collection of machines that individually or jointly execute a set (or multiple sets) of instructions to perform any algorithms or methodology discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), and a static memory 606 (e.g., flash memory, static random access memory (SRAM), etc.), a storage device 608 and a signal generation device 616 which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like.

The processor 602 is configured to execute the instructions 626 for performing the operations discussed herein. For example, the processor 602 executes the instruction 626 to perform operations including defining a set of input-output equations describing a fabrication process, in which a thread offset is expressed as a summation of individual context offsets. The process is associated with a plurality of individual contexts, and the first thread involves a first combination of individual contexts, defining a state-space model that describes an evolution of the process, estimating each individual context offset for the first thread based on the first input-output equation and the state-space model, or controlling the process using the estimated individual context offsets.

The computer system 600 may further include a network interface device 618 to communicate via a network. The computer system 600 also may include a display device 610 (e.g., a cathode ray tube (CRT) or a liquid crystal display (LCD) or plasma display panel (PDP) or thin-film transistor displays (TFT), or organic light-emitting diode (OLED), or nanocrystal displays, etc.), an alphanumeric input device 612 (e.g., a keyboard) and a cursor control device 614 (e.g., a mouse). The alphanumeric input device 612 and/or the cursor control device 614 may be implemented as a touch screen on the display device 610.

The storage device 608 may include a machine-accessible storage medium 624 on which is stored one or more sets of instructions (e.g., software 628) embodying any one or more of the methodologies or functions described herein. The software 628 may also reside, completely or at least partially, within the main memory 604 and/or within the processor 602. In other words, during execution thereof by the computer system 600, the main memory 604 and the processor 602 also constitute machine-accessible storage media. The software 628 may further be transmitted or received over a network via the network interface device 618.

While the machine-accessible storage medium 624 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine (e.g., a computer) and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

I claim:

1. A computer-implemented method for run-to-run control, the method comprising:
   identifying contexts associated with a fabrication process, the fabrication process having one or more threads, and each thread involving one or more contexts;
   defining a set of input-output equations describing the fabrication process, wherein each input-output equation corresponds to a thread and includes a thread offset expressed as a summation of individual context offsets, wherein each individual context offset is estimated based on a moving horizontal state estimation; and
   creating a state-space model that describes an evolution of the fabrication process using the set of input-output equations, the state-space model allowing to estimate individual context offsets, wherein the thread offset is unbiased even if the individual context offsets are biased when the corresponding thread corresponds to a combination of the one or more contexts.

2. The method of claim 1, wherein an input-output equation for a $k^{th}$ thread can be formulated as:

$$y_k = bu_{k-1} + d_{1,k-1} + d_{2,k-1} \ldots + d_{M,k-1}$$

where $y_k$ and $u_{k-1}$ represent an output vector and an input vector, respectively, b is a slope obtained through experimentation, and $d_{1,k-1}, d_{2,k-1}, \ldots, d_{M,k-1}$ are individual context offsets of individual contexts, 1, 2, . . . , M when thread k is associated with a combination of M individual contexts.

3. The method of claim 2, wherein the state-space model is formulated as:

$$x_{k+1} = Ax_k + Bu_k + Fw_k$$

$$y_k = C_k x_k$$

where $y_k$ and $u_k$ represent a process output vector and a process input vector, respectively, $x_k$ represents a process state vector, $w_k$ represents a process state noise vector, and A, B, C and F represent parameter matrices.

4. The method of claim 3, wherein the parameter matrices are defined as:

$$A_k = \begin{bmatrix} 0 & 0 & \ldots & 0 \\ 0 & I_1 & \ldots & 0 \\ \vdots & \vdots & \ddots & \vdots \\ 0 & \ldots & \ldots & I_M \end{bmatrix}, B_k = \begin{bmatrix} 1 \\ 0 \\ \vdots \\ 0 \end{bmatrix}, C_k = \begin{bmatrix} b & c_{q,1} & \ldots & c_{q,M} \end{bmatrix}$$

$$F_k = \begin{bmatrix} 0 & 0 & \ldots & 0 \\ I_1 & 0 & \ldots & 0 \\ 0 & I_2 & \ldots & 0 \\ \vdots & \vdots & \ddots & \vdots \\ 0 & 0 & \ldots & I_M \end{bmatrix}$$

where M represents a number of types of contexts, $I_j (j=1, 2, \ldots, M)$ represents an identity matrix with a dimension of a number of contexts with type j, the elements of row vector $c_{q,1}, c_{q,2}, \ldots, c_{q,m}$ are defined as:

$$c_{q_j,j} = \begin{cases} 0 & \text{for other contexts of type } j \\ 1 & \text{when } q_j^{th} \text{ context of type } j \text{ is used in the current run} \end{cases},$$

and with a fabrication process containing three types of contexts—processing tool, product and layer, the matrices will be:

$$A = \begin{pmatrix} 0 & 0 & 0 & 0 \\ 0 & I_T & 0 & 0 \\ 0 & 0 & I_P & 0 \\ 0 & 0 & 0 & I_L \end{pmatrix}$$

-continued $$B = \begin{pmatrix} 1 \\ 0 \\ 0 \\ 0 \\ 0 \end{pmatrix}$$

$$C = [b \ c_{T,q} \ c_{P,r} \ c_{L,s}]$$

$$F = \begin{pmatrix} 0 & 0 & 0 \\ I_T & 0 & 0 \\ 0 & I_P & 0 \\ 0 & 0 & I_L \end{pmatrix}$$

where $I_T$, $I_P$ and $I_L$ are identity matrices with a dimension of the number of processing tools, the number of products and the number of layers, respectively, and $c_{T,q}$, $c_{P,r}$ and $c_{L,s}$ are defined as:

$$c_{T,q} = \begin{cases} 0 & \text{for other tools} \\ 1 & \text{when } q^{th} \text{ tool is used in the current run} \end{cases}$$

$$c_{P,r} = \begin{cases} 0 & \text{for other products} \\ 1 & \text{when } r^{th} \text{ product is manufactured in the current run} \end{cases}$$

$$c_{L,s} = \begin{cases} 0 & \text{for other layers} \\ 1 & \text{when } s^{th} \text{ layer is formed in the current run} \end{cases}$$

when the process is associated with one or more processing tools, one or more products and one or more layers.

5. A computer-implemented method for run-to-run control, the method comprising:
  causing a pilot run to be performed for a first thread in a process;
  estimating individual context offsets for the first thread based on the pilot run using a state-space model that describes an evolution of the process, wherein the evolution of the process is described using a set of input-output equations, in which a thread offset is expressed as a summation of individual context offsets, wherein each individual context offset is estimated based on a moving horizontal state estimation;
  for a next thread in the process, determining whether the next thread involves a new context not involved in any of previous threads;
  if the next thread involves the new context, causing a pilot run to be performed for the next thread to estimate individual context offsets for the new context using the state-space model; and
  if the next thread does not involve the new context, refraining from causing the pilot run to be performed for the next thread.

6. The method of claim 5, further comprising:
  if the next thread does not involve the new context, re-estimating individual context offsets for one or more existing contexts in the next thread using history data, and utilizing the re-estimated individual context offsets to determine a thread offset for the next thread.

7. The method of claim 5, wherein the next thread involves the new context and an existing context in the first thread, and the method further comprises:
  re-estimating a context offset for the existing context using the state-space model reflecting the pilot run for the next thread.

8. The method of claim 5, further comprising:
  preparing a recipe for the process based on the estimated individual context offsets.

9. The method of claim 8, wherein preparing the recipe comprises calculating the recipe using a model predictive calculation.

10. A system for run-to-run control, the system comprising:
  a memory; and
  a processor, coupled to the memory, to:
    identify contexts associated with a fabrication process, the fabrication process having one or more threads, and each thread involving one or more contexts;
    define a set of input-output equations describing the fabrication process, wherein each input-output equation corresponds to a thread and includes a thread offset expressed as a summation of individual context offsets, wherein each individual context offset is estimated based on a moving horizontal state estimation; and
    create a state-space model that describes an evolution of the fabrication process using the set of input-output equations, the state-space model allowing to estimate individual context offsets, wherein the thread offset is unbiased even if the individual context offsets are biased when the corresponding thread corresponds to a combination of the one or more contexts.

11. The system of claim 10, wherein an input-output equation for a $k^{th}$ thread can be formulated as:

$$y_k = bu_{k-1} + d_{1,k-1} + d_{2,k-1} + \ldots + d_{M,k-1}$$

where $y_k$ and $u_{k-1}$ represent an output vector and an input vector, respectively,
b is a slope obtained through experimentation, and
$d_{1,k-1}, d_{2,k-1}, \ldots, d_{M,k-1}$ are individual context offsets of individual contexts, 1, 2, ..., M when thread k is associated with a combination of M individual contexts.

12. The system of claim 11, wherein the state-space model is formulated as:

$$x_{k+1} = Ax_k + Bu_k + Fw_k$$

$$y_k = C_k x_k$$

where $y_k$ and $u_k$ represent a process output vector and a process input vector, respectively,
$x_k$ represents a process state vector,
$w_k$ represents a process state noise vector, and
A, B, C and F represent parameter matrices,
wherein the parameter matrices are defined as:

$$A_k = \begin{bmatrix} 0 & 0 & \ldots & 0 \\ 0 & I_1 & \ldots & 0 \\ \vdots & \vdots & \ddots & \vdots \\ 0 & \ldots & \ldots & I_M \end{bmatrix}, B_k = \begin{bmatrix} 1 \\ 0 \\ \vdots \\ 0 \end{bmatrix}, C_k = [b \ c_{q,1} \ \ldots \ c_{q,M}]$$

$$F_k = \begin{bmatrix} 0 & 0 & \ldots & 0 \\ I_1 & 0 & \ldots & 0 \\ 0 & I_2 & \ldots & 0 \\ \vdots & \vdots & \ddots & \vdots \\ 0 & 0 & \ldots & I_M \end{bmatrix}$$

where M represents the number of types of contexts, $I_j$ (j=1, 2, ..., M) represents an identity matrix with a dimension of the number of contexts with type j, the elements of row vector $c_{q,1}, c_{q,2}, \ldots, c_{q,M}$ are defined as:

$$c_{q_j,j} = \begin{cases} 0 & \text{for other contexts of type } j \\ 1 & \text{when } q_j^{th} \text{ context of type } j \text{ is used in the current run} \end{cases}$$

and with a fabrication process containing three types of contexts—processing tool, product and layer, the matrices will be:

$$A = \begin{pmatrix} 0 & 0 & 0 & 0 \\ 0 & I_T & 0 & 0 \\ 0 & 0 & I_P & 0 \\ 0 & 0 & 0 & I_L \end{pmatrix}$$

$$B = \begin{pmatrix} 1 \\ 0 \\ 0 \\ 0 \end{pmatrix}$$

$$C = [b \; c_{T,q} \; c_{P,r} \; c_{L,s}]$$

$$F = \begin{pmatrix} 0 & 0 & 0 \\ I_T & 0 & 0 \\ 0 & I_P & 0 \\ 0 & 0 & I_L \end{pmatrix}$$

where $I_T$, $I_P$ and $I_L$ are identity matrices with a dimension of the number of processing tools, the number of products and the number of layers, respectively, and $c_{T,q}$, $c_{P,r}$ and $c_{L,s}$ are defined as:

$$c_{T,q} = \begin{cases} 0 & \text{for other tools} \\ 1 & \text{when } q^{th} \text{ tool is used in the current run} \end{cases}$$

$$c_{P,r} = \begin{cases} 0 & \text{for other products} \\ 1 & \text{when } r^{th} \text{ product is manufactured in the current run} \end{cases}$$

$$c_{L,s} = \begin{cases} 0 & \text{for other layers} \\ 1 & \text{when } s^{th} \text{ layer is formed in the current run} \end{cases}$$

when the process is associated with one or more processing tools, one or more products and one or more layers.

13. A system for run-to-run control, the system comprising:

a memory; and a processor, coupled to the memory, to:

cause a pilot run to be performed for a first thread in a process;

estimate individual context offsets for the first thread based on the pilot run using a state-space model that describes an evolution of the process, wherein the evolution of the process is described using a set of input-output equations, in which a thread offset is expressed as a summation of individual context offsets, wherein each individual context offset is estimated based on a moving horizontal state estimation;

for a next thread in the process, determine whether the next thread involves a new context not involved in any of previous threads;

if the next thread involves the new context, cause a pilot run to be performed for the next thread to estimate individual context offset for the new context using the state-space model; and if the next thread does not involve the new context, refrain from causing the pilot run to be performed for the next thread.

14. The system of claim 13, wherein the processor is further to:

re-estimate individual context offsets for one or more existing contexts in the next thread using history data, and utilize the re-estimated individual context offsets to determine a thread offset for the next thread if the next thread does not involve the new context.

15. The system of claim 13, wherein the second thread involves the new context and an existing context in the first thread, and the processor is further to:

re-estimate a context offset for the existing context using the state-space model reflecting the pilot run for the next thread.

16. A non-transitory computer-readable storage medium storing instructions that when executed by a computer, cause the computer to perform a method for run-to-run control, the method comprising:

causing a pilot run to be performed for a first thread in a process;

estimating individual context offsets for the first thread based on the pilot run using a state-space model that describes an evolution of the process, wherein the evolution of the process is described using a set of input-output equations, in which a thread offset is expressed as a summation of individual context offsets, wherein each individual context offset is estimated based on a moving horizontal state estimation;

for a next thread in the process, determining whether the next thread involves a new context not involved in any of previous threads;

if the next thread involves the new context, causing a pilot run to be performed for the next thread to estimate individual context offset for the new context using the state-space model; and if the next thread does not involve the new context, refraining from causing the pilot run to be performed for the next thread.

* * * * *